(12) United States Patent
Horikawa (10) Patent No.: US 8,045,244 B2
(45) Date of Patent: Oct. 25, 2011

(54) HOLOGRAPHIC PROJECTION METHOD AND HOLOGRAPHIC PROJECTION DEVICE

(75) Inventor: Yoshiaki Horikawa, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 12/341,623

(22) Filed: Dec. 22, 2008

(65) Prior Publication Data

US 2009/0103151 A1 Apr. 23, 2009

Related U.S. Application Data

(63) Continuation of application No. PCT/JP2008/053282, filed on Feb. 26, 2008.

(30) Foreign Application Priority Data

Mar. 2, 2007 (JP) ................................. 2007-053109

(51) Int. Cl.
*G03H 1/08* (2006.01)
*G03H 1/16* (2006.01)
*G03B 21/00* (2006.01)
*G06K 9/36* (2006.01)

(52) U.S. Cl. ................. 359/9; 359/29; 353/31; 382/280
(58) Field of Classification Search .................. 359/9, 92
See application file for complete search history.

(56) References Cited

U.S. PATENT DOCUMENTS

| 5,132,839 | A | * | 7/1992 | Travis ........................... 359/462 |
| 5,589,955 | A | | 12/1996 | Amako et al. |
| 5,627,678 | A | | 5/1997 | Nishii et al. |
| 5,798,864 | A | | 8/1998 | Sekiguchi |
| 6,011,874 | A | | 1/2000 | Gluckstad |
| 6,346,695 | B2 | * | 2/2002 | Yanagawa et al. ............ 250/205 |
| 6,844,947 | B2 | | 1/2005 | Salehi et al. |
| 7,218,435 | B2 | | 5/2007 | Slinger |
| 7,470,028 | B2 | | 12/2008 | Miller |
| 7,976,170 | B2 | * | 7/2011 | Horikawa ........................ 353/31 |
| 2002/0149584 | A1 | | 10/2002 | Simpson et al. |
| 2003/0010763 | A1 | | 1/2003 | Fukuchi et al. |
| 2007/0024999 | A1 | | 2/2007 | Crossland et al. |
| 2007/0113012 | A1 | | 5/2007 | Cable et al. |

(Continued)

FOREIGN PATENT DOCUMENTS

JP 7-261125 A 10/1995

(Continued)

OTHER PUBLICATIONS

"Floating Point," http://en.wikipedia.org/wiki/Floating-point, Dec. 15, 2010.*

(Continued)

*Primary Examiner* — Jade R Chwasz
(74) *Attorney, Agent, or Firm* — Holtz, Holtz, Goodman & Chick, P.C.

(57) ABSTRACT

Video image data is converted into spatial frequency information using Fourier transformation. The spatial frequency information is provided to an information display unit. The spatial frequency information as a phase distribution is displayed on the information display unit, light is irradiated onto the information display unit using a light source, and the amount of light that is irradiated by the light source is adjusted based on the video image data. And diffraction light, which is irradiated by the light source and modulated as the spatial frequency information by the information display unit, is projected onto a projecting unit.

3 Claims, 5 Drawing Sheets

U.S. PATENT DOCUMENTS

| | | |
|---|---|---|
| 2008/0212034 A1 | 9/2008 | Aksyuk et al. |
| 2008/0212040 A1 | 9/2008 | Aksyuk |
| 2009/0109405 A1 | 4/2009 | Horikawa |

FOREIGN PATENT DOCUMENTS

| | | |
|---|---|---|
| JP | 11-504129 A | 4/1999 |
| JP | 2001-272636 A | 10/2001 |
| JP | 2002-207202 A | 7/2002 |
| WO | WO 2005/059881 A3 | 6/2005 |
| WO | WO 2006/134404 A1 | 12/2006 |
| WO | WO 2006/1334404 A1 | 12/2006 |

OTHER PUBLICATIONS

English Language International Search Report dated May 20, 2007 issued in parent Appln. No. PCT/JP2008/053282.

International Preliminary Report on Patentability and Written Opinion (in English) dated Sep. 17, 2009 issued in a counterpart International Application No. PCT/JP2008/053282.

Related U.S. Appl. No. 12/341,770, filed Dec. 22, 2008; Inventor: Yoshiaki Horikawa; Title: Holographic Projection Method and Holographic Projection Device.

* cited by examiner

HOLOGRAPHIC PROJECTION METHOD AND HOLOGRAPHIC PROJECTION DEVICE

CROSS REFERENCE TO RELATED APPLICATIONS

This is a Continuation Application of PCT Application No. PCT/JP2008/053282, filed Feb. 26, 2008, which was published under PCT Article 21(2) in Japanese.

This application is based upon and claims the benefit of priority from prior Japanese Patent Application No. 2007-053109, filed Mar. 2, 2007, the entire contents of which are incorporated herein by reference.

BACKGROUND OF THE INVENTION

1. Field of the Invention

The present invention relates to a holographic projection method and a holographic projection device.

2. Description of the Related Art

In general, examples of a projection device that projects a video image onto a screen include a projection device using transmission type liquid crystal (LC), a projection device using reflecting liquid crystal (liquid crystal on silicon [LCOS]), and a projection device using a digital micromirror device (DMD).

For example, in the projection device using liquid crystal, a video image is projected onto a screen as follows. That is, first, a video image that a user desires to project is displayed on liquid crystal in accordance with video image data. Then, the liquid crystal is illuminated by illumination light and transmission light or reflection light is projected by a projection lens, and the video image displayed on the liquid crystal is enlarged and displayed on a screen to be enlarged.

In the projection device using a DMD, a video image in displayed on the DMD by turning on/off the micromirrors which constitute the DMD and correspond to pixels in accordance with video image data and then the video image is projected onto a screen by a projection lens.

The above-described projection devices adopt a method in which a video image is displayed on an image display element, e.g; using liquid crystal at a time and the displayed video image is projected to be enlarged, and by the projection lens. Accordingly, the above-described projection devices each include a light source, an illumination optical system, an image display element, and a projection lens.

In addition, in a color sequencing expression, a color filter that changes a color of a light source is further required. In a method that uses a plurality of image display elements for each color, a color separation/synthesis optical system that is provided around the image display elements is further required.

In general, an incoherent light source, such as a high pressure mercury lamp, is used as a light source. Therefore, as the light source, a complicated illumination optical system that efficiently and uniformly illuminates light to the image display elements is needed. As a result, the size of the illumination optical system is increased, which results in increasing manufacturing costs.

In addition, a projection lens having a high precision is needed to project high-definition video images that are displayed on the image display elements. As a result, the size of the projection lens is increased, which results in increasing manufacturing costs.

For a color conversion, a color filter needs to be provided or a color synthesis/separation optical system needs to be provided around the excessively complicated image display elements. Accordingly, the size of the projection device and the manufacturing costs may be increased.

Figure 7:
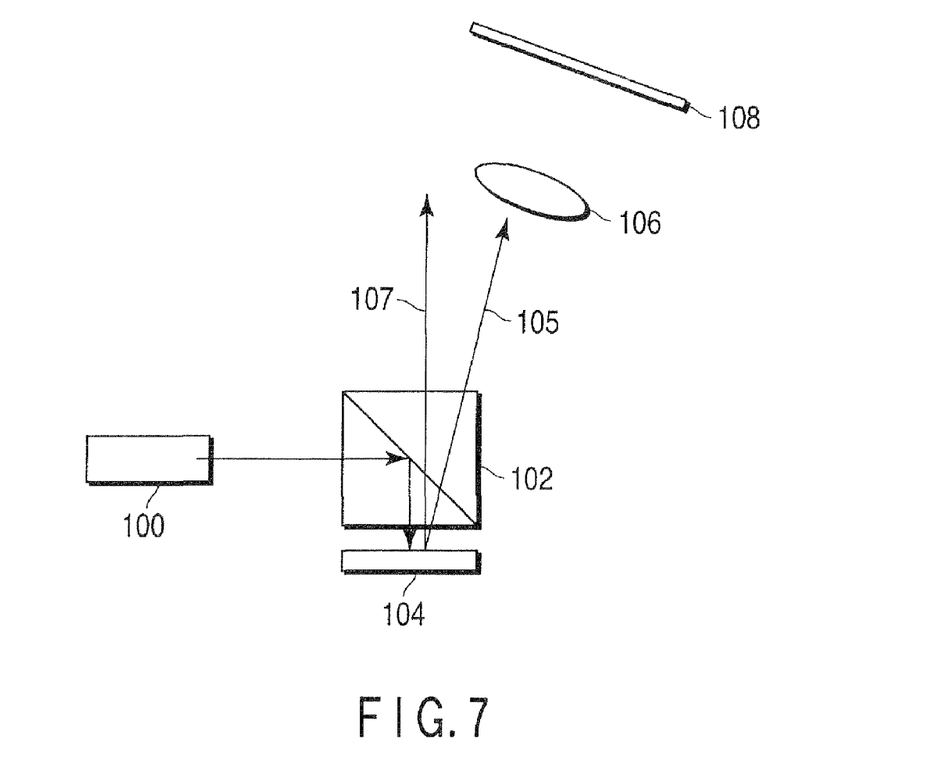
FIG. 7 is a diagram illustrating the configuration of a projector that uses a conventionally suggested SPM.

In view of such circumstances, a projection device (called a holographic projection device) using a spatial light phase modulator (SPM), which is shown in FIG. 7, is suggested. For example, this type of projection device is disclosed in detail in WO 2005/059881A3.

That is, in the projection device that is disclosed in WO 2005/059881A3, as shown in FIG. 7, linearly polarized light from a light source (laser) 100 is incident on a polarized beam splitter (PBS) 102, reflected on the PBS 102, and incident on an LCOS 104 that is the SPM. In addition, a λ/4 plate (not shown) is provided between the PBS 102 and the LCOS 104.

Diffraction light 105 is subjected to phase modulation by the LCOS 104 in accordance with video image data and then reflected. The diffraction light 105 passes through the λ/4 plate again, is transmitted through the PBS 102, and is projected onto a screen 108 through a projection lens 106. In this case, a binary modulation of a phase difference $\pi$ is obtained according to whether or not the phase modulation is performed by the LCOS 104. Meanwhile, zero-order light 107 is not incident on the projection lens 106.

As such, for example, in WO 2005/059881A3, a small-sized projection device is disclosed, which uses a simple illumination optical system and includes a simple projection lens.

The method that is disclosed in WO 2005/059881A3 is a method that projects a video image using diffraction. In this case, the brightness of the projected video image is determined based on diffraction efficiency of a spatial light phase modulator. For example, in the case of the binary modulation of the phase difference $\pi$, diffraction efficiency is approximately 40%. In addition, if the amount of phase modulation is changed minutely, it is possible to improve diffraction efficiency. In addition, if the amount of phase modulation is continuously changed, the diffraction efficiency ideally reaches 100%.

In addition, the total amount of the diffracted light with respect to the light source occupies a predetermined ratio. However, a bright scene and a dark scene exist in the video image, and the total amount of light is changed. Accordingly, when the brightness of the light source is constant, for example, an originally dark scene of a video image may be displayed bright. For this reason, the total amount of brightness of each scene needs to be calculated for each scene based on video image data, and the amount of light that is incident on the SPM needs to be adjusted such that the brightness of each scene is appropriately maintained with respect to a scene having the maximum brightness.

As a technology that may be used to solve the above-described problems, for example, U.S. Pat. No. 5,589,955A discloses the following technology. In the case that characters of dot patterns are drawn, since the number of dots is different for each character, an output of a laser that is a light source is increased or decreased make brightness of each character the same by counting the number of the dots.

BRIEF SUMMARY OF THE INVENTION

According to a first aspect of the invention, there is provided a holographic projection method comprising:

a Fourier transformation step of converting video image data into spatial frequency information using Fourier transformation;

an information provision step of providing the spatial frequency information to information display unit;

a display step of displaying the spatial frequency information on the information display unit;

an irradiation step of irradiating light onto the information display unit using light sources;

a light amount adjustment step of adjusting the amount of light that is irradiated by the light sources based on the video image data; and a projection step of projecting diffraction light, which is irradiated by the light sources and modulated as the spatial frequency information by the information display unit onto projection surfaces. As a result, it is possible to display a video image having appropriate brightness.

According to a second aspect of the invention, there is provided the holographic projection method according to the first aspect, wherein, in the Fourier transformation step, the Fourier transformation is performed after adding random phases to overlap the video image data. As a result, it is possible to improve diffraction efficiency by using a spatial light phase modulator as an element that displays information subjected to Fourier transformation.

According to a third aspect of the invention, there is provided the holographic projection method according to the first or second aspect, wherein the light sources include at least a red light source, a green light source, and a blue light source, and in the light amount adjustment step, the amount of light irradiated by the red light source, the green light source, and the blue light source is controlled based on the video image data. As a result, it is possible to display video images for red, green, and blue each having appropriate brightness and to display video images having an excellent color balance.

According to a fourth aspect of the invention, there is provided the holographic projection method according to the first to third aspects, wherein the amount of light incident from the light sources is set to zero, while the spatial frequency information is altered in the information display unit. As a result, unnecessary diffraction light can be prevented from overlapping a video image, thereby providing a clear video image.

According to a fifth aspect of the invention, there is provided the holographic projection method according to the first to fourth aspects, wherein the adjustment of the light amount in the light amount adjustment step is performed by controlling the light sources. As a result, a light intensity modulator is not needed, so that a simple projection device that rarely causes a failure can be provided at low cost.

According to a sixth aspect of the invention, there is provided the holographic projection method according to the first to fourth aspects, wherein the adjustment of the light amount in the light amount adjustment step is performed by filter unit for filtering the light emitted from the light sources. As a result, control unit of a light source may not be installed.

According to a seventh aspect of the invention, there is provided the holographic projection method according to the first to fifth aspects, wherein, in the irradiation step, the light irradiated onto the information display unit by the light sources is light that is uniformly irradiated onto the information display unit. As a result, a contribution of the displayed Fourier transformed information to each pixel can be equally maintained and a calculation process of a video image can be simplified.

According to an eighth aspect of the invention, there is provided a holographic projection device comprising:

light sources to irradiate light;

data processing unit for converting video image data into spatial frequency information using Fourier transformation;

information display unit for displaying the spatial frequency information;

an optical system which irradiates light onto the information display unit using the light sources; and light amount control unit for adjusting the amount of light irradiated by the light sources based on the video image data, wherein diffraction light, which is irradiated by the light sources and modulated as the spatial frequency information by the information display unit, is projected onto projection surfaces. As a result, it is possible to provide a device that can display a video image having appropriate brightness.

According to a ninth aspect of the invention, there is provided the holographic projection device according to the eighth aspect, wherein the data processing unit performs the Fourier transformation after adding random phases to the video image data. As a result, a spatial light modulator having high diffraction efficiency can be used as a display element for a Fourier transformation result and a projection device, by which a bright video image to be displayed, can be realized.

According to a tenth aspect of the invention, there is provided the holographic projection device according to the eighth or ninth aspect, wherein the light sources include at least a red light source, a green light source, and a blue light source, and the light amount control unit controls the amount of light irradiated by the red light source, the green light source, and the blue light source, based on the video image data. As a result, it is possible to provide a projection device that has an excellent color balance.

According to an eleventh aspect of the invention, there is provided the holographic projection device according to the eighth to tenth aspects, wherein the amount of light incident from the light sources is set to zero, while the spatial frequency information is altered in the information display unit. As a result, unnecessary diffraction light can be prevented from being emitted from a display element at the moment correct Fourier transformation information is not displayed, and a clear video image having high contrast can be provided.

According to a twelfth aspect of the invention, there is provided the holographic projection device according to the eighth to eleventh aspects, wherein the light amount control unit controls the amount of light by controlling the light sources. As a result, an element that modulates light intensity does not need to be additionally used, and a simple projection device that rarely causes a failure can be realized at low cost.

According to a thirteenth aspect of the invention, there is provided the holographic projection device according to the eighth to eleventh aspects, wherein the light amount control unit is filter unit for filtering the light emitted from the light sources. As a result, the control unit of a light source may not be installed. In addition, it is possible to use a light source where a response speed is slow.

According to a fourteenth aspect of the invention, there is provided the holographic projection device according to the eighth to twelfth aspects, wherein the optical system is an optical system that uniformly irradiates the information display unit using the light emitted from the light sources. As a result, it is possible to uniformly irradiate illumination light onto information display unit. Accordingly, a contribution of the displayed Fourier transformed information to each pixel can be equally maintained and a calculation process of a video image can be simplified.

According to a fifteenth aspect of the invention, there is provided a holographic projection device comprising:

light sources which include at least a red light source, a green light source, and a blue light source;

data processing unit for converting video image data into spatial phase information using Fourier transformation after adding random phases to the video image data;

spatial light phase modulators which display the spatial phase information;

an optical system which irradiates light emitted from the light sources onto the spatial light phase modulators; and control unit for setting the amount of light incident from the light sources to zero, while the spatial phase information is altered in the spatial light phase modulators. As a result, video image display having optimal brightness with respect to bright and dark video images can be made, and a holographic projection device having high contrast and optimal brightness can be provided.

According to a sixteenth aspect of the invention, there is provided the holographic projection device according to the fifteenth aspect, wherein the control is to adjust the amount of light irradiated by the light sources based on the video image data by controlling drivers of the light sources. As a result, it is possible to provide a bright video image having an excellent color balance.

According to a seventeenth aspect of the invention, there is provided the holographic projection device according to the sixteenth aspect, wherein the light sources each are composed of a laser diode. As a result, it is possible to easily perform a brightness modulation of a light source.

According to an eighteenth aspect of the invention, there is provided the holographic projection device according to the seventeenth aspect, wherein the spatial light phase modulators each are composed of a reflecting liquid crystal device. As a result, it is possible to achieve high-definition video image display.

According to a nineteenth aspect of the invention, there is provided the holographic projection device according to the seventeenth aspect, wherein the spatial light phase modulators each are composed of a reflecting mirror device. As a result, it is possible to display a video image that has high definition and is bright.

According to a twentieth aspect of the invention, there is provided the holographic projection device according to the seventeenth to nineteenth aspects, wherein the control unit controls illumination light from the light sources such that the illumination light is not irradiated onto an area beyond an effective display range in the spatial light phase modulators. As a result, it is possible to display a clear video image having excellent contrast.

According to a twenty-first aspect of the invention, there is provided the holographic projection device according to the eighteenth or nineteenth aspect, further comprising:

unit for trapping zero-order light reflected on the spatial light phase modulator. As a result, it is possible to prevent unnecessary stray light due to zero-order light, and a clear video image having excellent contrast can be displayed.

According to a twenty-second aspect of the invention, there is provided the holographic projection device according to the fifteenth aspect, further comprising; the zero-order light trap having a function of an optical sensor that measures intensity of light, wherein the control unit controls the amount of light irradiated by the light source based on output information of the zero-order light trap. As a result, it is possible to represent a dynamic image having excellent contrast for both dark and bright video image.

According to a twenty-third aspect of the invention, there is provided the holographic projection device according to the fifteenth aspect, further comprising; the zero-order light trap having a function of an optical sensor that measures intensity of light, wherein the control unit controls the amount of light irradiated by the light source based on output information of the zero-order light trap and the video image data. As a result, it is possible to represent a dynamic image having excellent contrast for both dark and bright video image without depending on a change in diffraction efficiency of a spatial light phase modulator due to a difference between video images.

According to a twenty-fourth aspect of the invention, there is provided the holographic projection device according to the eighth or nineteenth aspect, wherein the control unit controls the amount of light irradiated by the light source based on a total light amount value of the amount of light in each scene of a video image by the video image data. As a result, it is possible to simply control brightness of the light source.

According to a twenty-fifth aspect of the invention, there is provided the holographic projection device according to the twenty-fourth aspect, wherein, when T is defined as the number of bits of a gradation and M and N are defined as the number of pixels of a projected video image in vertical and horizontal directions respectively, and brightness of each pixel is defined as represented by the following Equation 1, the control unit calculates the total light amount value using the following Equation 2:

$$B(x, y) = 2^T \qquad \text{(Equation 1)}$$

$$H = \sum_{y=1}^{M} \sum_{x=1}^{N} B(x, y) \qquad \text{(Equation 2)}$$

As a result, it is possible to calculate the total light amount value.

According to a twenty-sixth aspect of the invention, there is provided the holographic projection device according to the twenty-third aspect, wherein, when H is defined as a total light amount value of a projected video image, S is defined as a light amount of zero-order light, and K is defined as a proportionality coefficient, the control unit controls the amount of light irradiated by the light source based on a value calculated using the following Equation 3:

$$F = \frac{H}{K} + S \qquad \text{(Equation 3)}$$

As a result, it is possible to control brightness of a video image with a high precision.

According to a twenty-seventh aspect of the invention, there is provided the holographic projection device according to the eighth or eighteenth aspect, wherein a calculation precision of the data processing unit is 12 bits or more. As a result, it is possible to display a video image having a sufficient gradation.

According to a twenty-eighth aspect of the invention, there is provided a holographic projection device comprising:

light sources which irradiate light;

data processing unit having a calculation precision of at least 12 bits or more, and converting video image data into spatial frequency information including spatial phase information using Fourier transformation;

spatial light phase modulators which display the spatial frequency information including the spatial phase information; and an optical system which irradiates light emitted from the light sources onto the spatial light phase modulators. As a result, it is possible to provide a holographic projection device that has a small size, a simple structure, a low manufacturing cost, and a high gradation.

According to a twenty-ninth aspect of the invention, there is provided the holographic projection device according to the fifteenth or twenty-eighth aspect, wherein the data processing unit converts the video image data into information including the spatial phase information after making a different random phase overlap the video image data in a subframe unit. As a result, it is possible to provide clear video image having no speckle noise.

According to a thirtieth aspect of the invention, there is provided a holographic projection method comprising:

a Fourier transformation step of converting video image data into spatial phase information using Fourier transformation after adding different random phases to the video image data in a subframe unit;

an information provision step of providing the spatial phase information to information display unit;

a display step of displaying the spatial phase information as a phase distribution on the information display unit;

an irradiation step of irradiating light emitted from light sources onto the information display unit;

a light amount adjustment step of controlling drivers of the light sources to adjust the amount of light irradiated by the light sources based on the video image data; and a projection step of projecting diffraction light, which is irradiated by the light sources and modulated as the spatial phase information by the information display unit, onto projection surfaces. As a result, it is possible to provide a clear video image having no speckle noise.

DETAILED DESCRIPTION OF THE INVENTION

Hereinafter, the preferred embodiments of the present invention will be described with reference to the accompanying drawings.

First Embodiment

Figure 1:
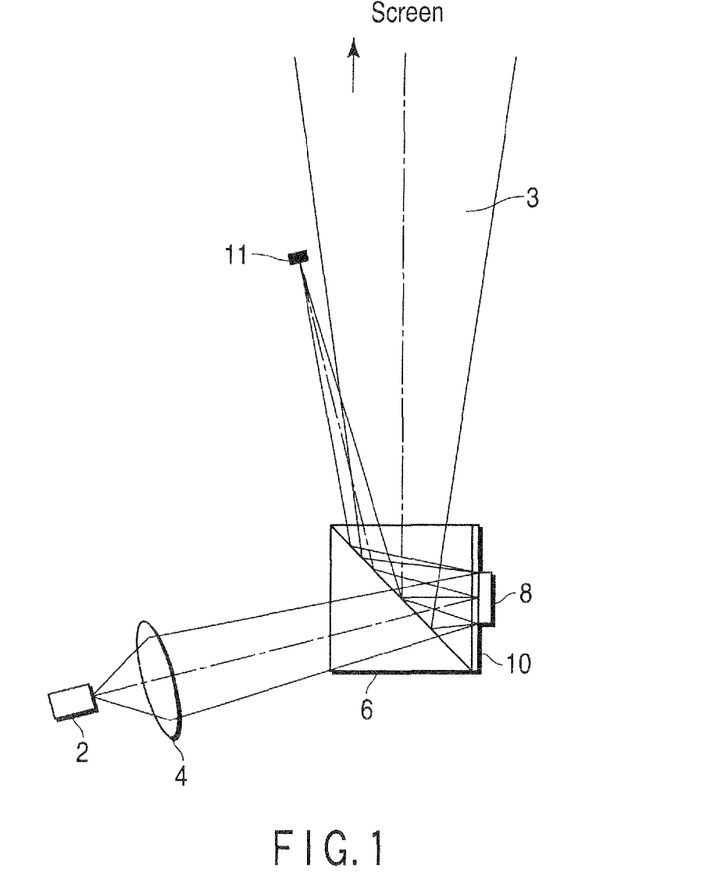
FIG. 1 is a block diagram illustrating an example of the configuration of a holographic projection device according to a first embodiment of the present invention.

FIG. 1 is a diagram illustrating an example of the configuration of a holographic projection device according to a first embodiment of the invention. As shown in the drawing, the holographic projection device according to the first embodiment includes a light source 2, a converging lens 4, a polarized beam splitter (PBS) 6, a SPM 8, a λ/4 plate 10, and a zero-order light trap 11.

Light that is emitted from the light source 2 is irradiated onto the SPM 8 via the PBS 6 by the converging lens 4. Diffraction light 3 that is modulated as information displayed on the SPM 8 is reflected, passes through the PBS 6 again, and is projected onto a screen (not shown). In this case, illumination light by the light source 2 is convergent light, and in a positional relationship between constituent members in the holographic projection device disposed at a normal location, the illumination light is irradiated onto the SPM 8 from an oblique upper side.

In addition, it is assumed that the light irradiated onto the SPM 8 by the light source 2 is light that is uniformly irradiated onto the SPM 8.

In the first embodiment, the spatial light phase modulator is assumed as a reflecting spatial light phase modulator, but may be a transmission-type spatial light phase modulator.

Meanwhile, in the first embodiment, the illumination light by the light source 2 is P-polarized light. The illumination light is transmitted through the PBS 6, transmitted through the λ/4 plate 10, and incident on the SPM 8 as circularly polarized light. The diffraction light 3 that is reflected on the SPM 8 is transmitted through the λ/4 plate 10 again, becomes S-polarized light, is reflected on the PBS 6, and is projected onto a screen.

However, a polarization direction of the illumination light by the light source 2 can be set as S so that the illumination light is reflected on the PBS 6, incident on the SPM 8, transmitted through the λ/4 plate 10, and reflected from the SPM 8. Diffracted light by the SPM 8 is changed to be P-polarized light, and is transmitted through the PBS 6 to be projected onto a screen.

Meanwhile, since the illumination light by the light source 2 is incident on the SPM 8 as convergent light by the converging lens 4, as shown in FIG. 1, it is possible to terminate zero-order light by the zero-order light trap 11. As a result, it is possible to surely separate the diffraction light projecting a video image from the zero-order light and to prevent contrast from being lowered in the projected video image.

In the reflecting SPM 8, a micromirror spatial light phase modulator (magic mirror device [MMD]) is used. In addition, the LCOS may be used as the SPM 8.

Figure 2:
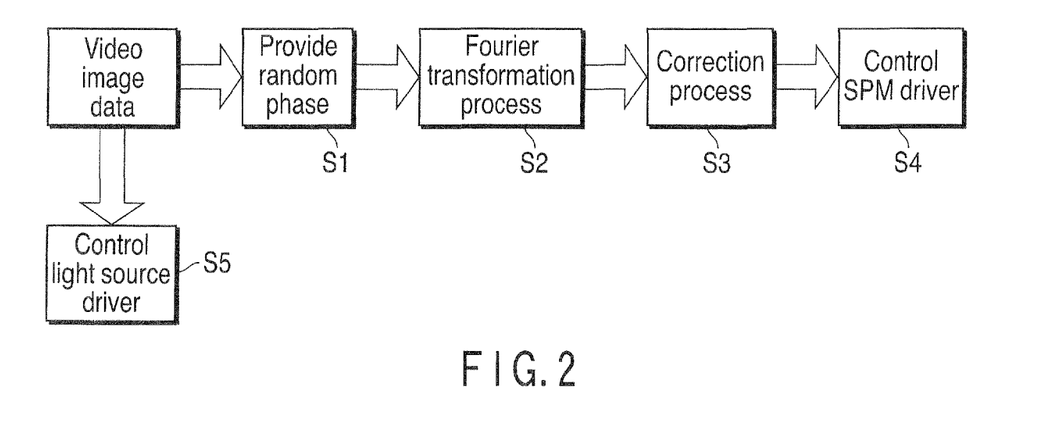
FIG. 2 is a diagram illustrating a sequence for converting video image data into information displayed on an MMD in a holographic projection device according to a first embodiment of the present invention.

Next, a sequence for converting video image data into information displayed on an MMD in the holographic projection device according to the first embodiment of the invention will be described with reference to FIG. 2. The process of each step shown in FIG. 2 is executed by control means (which is not shown in FIG. 1) that is included in the holographic projection device according to the first embodiment.

In the first embodiment, phase information obtained by subjecting video image data to Fourier transformation is displayed on the SPM 8. The illumination light is irradiated onto the SPM 8 and the diffraction light by the SPM 8 is projected onto the screen 6. It is preferable that the illumination light from the light source 2 be not irradiated beyond an effective display range of phase information in the SPM 8.

First, video image data of a video image to be projected is obtained. In this case, the video image data is subjected to Fourier transformation to be converted into spatial frequency distribution information. However, when the video image data is subjected to Fourier transformation as it is, a spatial phase distribution and an intensity distribution may be generated. That is, when the video image data is subjected to Fourier transformation as it is, it is not possible to diffract light by a phase modulation with excellent diffraction efficiency.

In consideration of this point, random phase information is added to video image data in advance (random phase provision step S1). In addition, after the random phase information is added to overlap the video image data, the video image data is subjected to Fourier transformation (Fourier transformation step S2). If the random phase information is added to the video image data, it means that a phase value different for each pixel is added to intensity information of each pixel of one frame of the video image data.

For example, it means that a value of 128+j is obtained, when the intensity of an arbitrary pixel is 128. In this case, j is a unit imaginary number. Eyes of a person (and image sensors) can feel only intensity of light. Accordingly, a phase that is represented in an imaginary unit does not have a practical meaning, but has an important meaning at the time of calculation. A phase is included in pure intensity information after subjecting video image data to Fourier transformation. However, if random phases are added to the video image data in advance, a value of intensity portion after Fourier transformation can be averaged over the entire spatial frequency surface, and the intensity can be equalized over the entire frequency surface. Accordingly, it is possible to obtain pure phase information having no change in intensity.

In the case where the video image data is subjected to Fourier transformation, after taking the root of the intensity of the video image signal, that is, converting the video image data into amplitude information, Fourier transformation is preferably performed. In addition, the random phase is preferably added to the amplitude information.

In this way, the video image data can be converted into phase information. As a result, the spatial frequency information can be converted into phase information, that is, spatial phase information. Since this method is a technology that is conventionally known as a kinoform, the detailed description thereof will be omitted herein. If a random phase is made overlap video image data, the intensity on the spatial phase distribution can be averaged and the video image data can be satisfied by only phase information.

The holography technology that also includes the kinoform is disclosed in detail in, for example, W. H. Lee: "Computer-generated holograms: techniques and applications," in Progress in Optics, E. Wolf, ed., (North-Holland, Amsterdam, 1978), Vol. 16, pp. 119-232.

Meanwhile, as described above, the video image data where the random phase overlaps and Fourier transformation is performed becomes spatial phase information that is composed of only phase information. In addition, a correction process (correction process step S3) based on optical arrangement is executed on the spatial phase information and the corrected spatial phase information is input to an SPM driver. In this case, the SPM driver is a driver that generates a driving signal to drive the SPM 8.

When the video image data has a gradation of A bits, the transform calculation is preferably made based on the number of bits that maintains the gradation. That is, in this case, it is preferable that effective digits of a Fourier transformation result be A bits or more. Accordingly, even in the mid-calculation, a precision of A bits or more is minimally needed.

In the related art, the gradation of the digital video image is 8 bits, and the calculation is also made based on the corresponding number of bits. In recent years, however, a gradation of 12 bits or more is required. Accordingly, a calculation precision of 12 bits or more, including digital data of an original video image, is needed.

In this case, as described with reference to FIG. 1, the illumination light by the light source 2 is convergent light and irradiated from the oblique upper side of the SPM 8. In addition, spatial phase information for projecting a video image in spreading on a front side with respect to said illumination light is provided to the SPM 8 by the SPM driver.

That is, after providing a phase (Step S1) when the video image data is subjected to Fourier transformation, spatial phase information that depends on the corresponding optical system is provided to the SPM 8, such that the video image is projected in a desired direction. The projection (holographic projection) method that uses diffraction in the first embodiment is different from a method that controls brightness of each pixel to form an image. That is, in the projection (holographic projection) method using diffraction in the first embodiment, brightness of each pixel is displayed on a screen by diffraction of light on the front side of the SPM 8.

Meanwhile, after providing the phase (said step S1) when the video image data is subjected to Fourier transformation, the spatial phase information that depends on the corresponding optical system is provided to the SPM 8, such that the video image is projected in a desired direction. Then, a driving signal is applied to the spatial phase modulator by the SPM driver, such that spatial phase information, which corresponds to a video image that is to be projected onto the SPM 8, appears as a phase distribution (SPM driver control step S4).

When the diffraction efficiency of the SPM 8 is constant, both a video image of a dark scene and a video image of a bright scene may become a video image that has the same brightness. Accordingly, in accordance with the total amount of the light amounts of the video images, the amount of light that is incident on the SPM 8 needs to be changed as follows.

That is, the total amount (the total light amount value; a calculation method thereof will be described in detail below) of brightness of each scene in video images is calculated, and the amount of light that is incident on the SPM 8 is controlled such that the brightness of each scene becomes appropriate (light source driver control step S5). In Step S5, the driver of the light source 2 is controlled based on the video image data.

In addition, the amount of light by the light source 2 may be controlled based on output information of the zero-order light trap 11. The zero-order light trap 11 may be composed of an optical sensor, and the amount of light by the light source 2 may be controlled based on the output information of the zero-order light trap 11 and the video image data.

In addition, a laser diode (LD) is generally used in the light source 2. In the case of the color display, the color display is performed using an LD for red, an LD for green, and an LD for blue.

In regards to controlling the amount of light, the light source may be controlled by filter means having a function of reducing the amount of light.

In addition, the light source may use a combination of three primary colors of complementary colors as long as three primary colors can constitute a color video image. That is, the combination is not limited to a combination of red, green, and blue.

Figure 3:
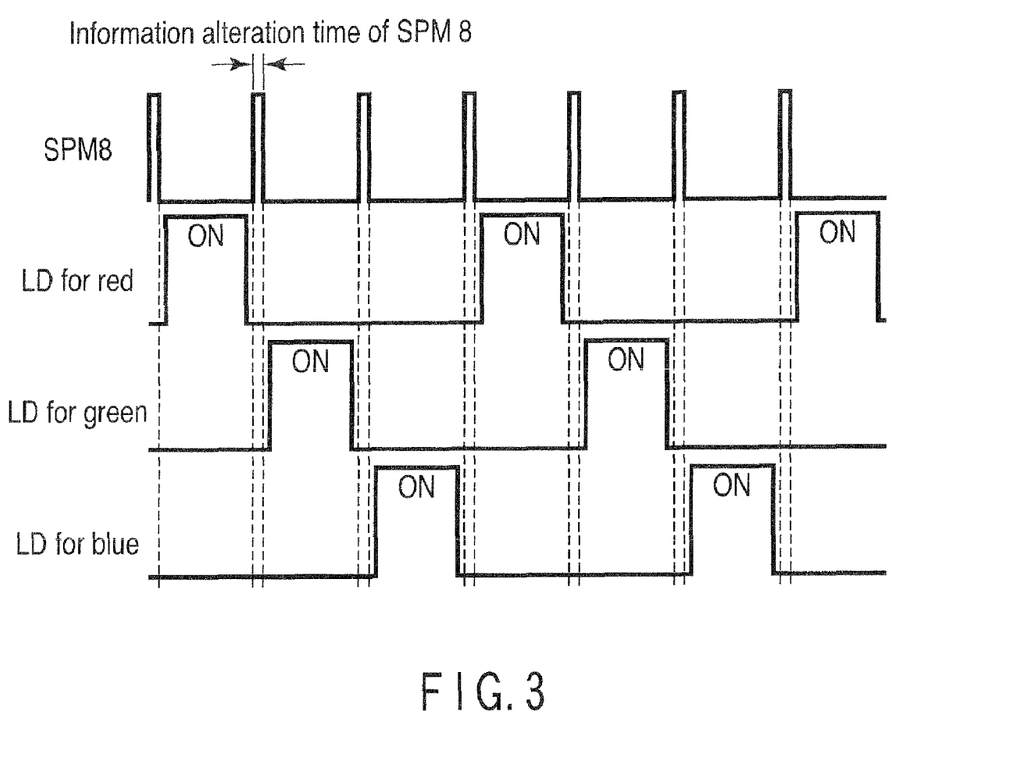
FIG. 3 is a diagram illustrating a timing chart that represents a relationship between an operation of an SPM and light-emitting operations of laser diodes for red, green, and blue by the same time base t, when color display is performed on a projection video image by performing color sequence light source control, in a holographic projection device according to a first embodiment of the present invention.

FIG. 3 is a diagram illustrating a timing chart that represents a relationship between an operation of an SPM 8 and light-emitting operations of LDs for red, green, and blue by the same time base t, when color display is performed on a projection video image by performing color sequence light source control using a holographic projection device according to a first embodiment of the invention.

That is, the holographic projection device according to the first embodiment includes one SPM 8, as shown in FIG. 1. Accordingly, the LDs for red, green, and blue are sequentially made emit light, thereby performing color display.

Specifically, for example, as shown in FIG. 3, while video image data for red (phase information obtained by applying Fourier transformation to the corresponding video image data) is displayed, the SPM 8 makes light emitted from the LD for red. In addition, with respect to the LDs for green and blue, as shown in FIG. 3, the same light emission control as the case of the LD for red is performed. In addition, while phase information to be displayed is altered, as shown in FIG. 3, the SPM 8 turns off all the LDs so as not to emit light. Instead of turning off the LD so as not to emit light, light shielding means may be installed to make light from the LD not incident.

In regards to the light amount control of the LDs, light emission intensity of an LD for each color is adjusted based on video image data. In addition, a light intensity modulator may be installed in the middle of an optical path of illumination light by the LD.

Meanwhile, when the ideal diffraction efficiency of the SPM 8 is 100%, the amount F of light that is incident on the SPM 8 is proportional to the total light amount value H of one scene in the projection video image. This is applicable to the case where diffraction efficiency is constant. Here, if brightness of a pixel of a gradation T-bit at address (x, y) is defined as B(x, y), the following Equation 7 is obtained.

$$B(x,y) \leq 2^T \qquad \text{(Equation 7)}$$

From Equation 7, the following Equation 8 is obtained and the total light amount value H of one scene can be calculated.

$$H = \sum_{y=1}^{M} \sum_{x=1}^{N} B(x, y) \qquad \text{(Equation 8)}$$

In this case, M and N denote the number of pixels vertically and the number of pixels horizontally, respectively. For example, in the case of a high-definition TV, the conditions M=1080 and N=1920 are applied. If the brightness of the light source is controlled based on the total light amount value H, appropriate brightness in each scene of video images is obtained. As a result, considerably clear video images can be reproduced dark in a dark scene of a video image and bright in a bright scene of a video image.

In addition, diffraction efficiency may be changed depending on a video image. In this case, in order to accurately perform a correction process, the amount S of zero-order light may be measured, and brightness of the light source may be controlled such that a value that is obtained by subtracting the amount S of zero-order light from the amount F of light incident on the SPM 8 is proportional to the total light amount value H. That is, if a proportionality coefficient is defined as K, the following Equation 9 is obtained.

$$K(F-S) = H \qquad \text{(Equation 9)}$$

That is, the brightness of the light source may be controlled such that the amount of incident light becomes the amount of light represented by the following Equation 10.

$$F = \frac{H}{K} + S \qquad \text{(Equation 10)}$$

Hereinafter, a method of reducing noise in a holographic projection method and a holographic projection device according to the first embodiment will be described. In WO 2005/059881A3, the reduction of noise is described as follows.

That is, according to the contents that are disclosed in WO 2005/059881A3, examples of noise include systematic noise and non-systematic noise. Further, according to the contents, systematic noise include noise due to an error that occurs at the time of reproducing a phase by the SPM and noise due to irregularity, and non-systematic noise include noise due to an error that occurs at the time of executing an algorithm and noise due to a binarization error. In addition, as a means for dealing with non-systematic noise, there is suggested a technology using a subframe as a technology that repeats one frame by any number of times as follows.

That is, for example, if time of one frame is 1/60 second, the corresponding time is divided into 1/180 second and the same video image is displayed three times. In this way, a method where noise is averaged and reduced is disclosed in WO 2005/059881A3. In addition, according to the contents that are disclosed in WO 2005/059881A3, since noise occurs by a device, a process of adding a random phase to video image data does not need to be repeated.

However, if the above-described various types of noise are reduced, speckle noise becomes highly visible. Speckle noise is noise that conspicuously occurs when a laser is used, in particular. That is, in a video image projected onto a screen where light from pixels around each pixel interferes with light from each pixel, speckle noise occurs when granular noise having high contrast is generated on the retina of a person who views the corresponding video image.

This speckle noise is generated when coherence exists in the light source used in projection. In speckle noise, if a wave surface is the same, the same speckle is reproduced. Accordingly, in the case of a video image where a projected video image gradually changes or a still picture, speckle noise is conspicuously observed in particular. For this reason, in the case of the video image where the projected video image gradually changes or the still picture, it is necessary to change a phase of projection light without changing the projected video image.

In view of such circumstances, in the first embodiment, one frame is divided into subframes. In each subframe, a random phase different from that of another subframe as a random phase added to video image data is added to the corresponding subframe. By this process, a shape of the generated speckle is changed and averaged, thereby reducing noise and displaying a clear video image.

The subframe is repeated two times by dividing one frame corresponding to 1/60 second into subframes each corresponding to 1/120 second. In this case, the video image data is repeated by adding different random phase data to the same video image data.

As described above, according to the first embodiment, it is possible to provide a holographic projection method and a holographic projection device, which can achieve video image display having appropriate brightness according to video image data and energy saving, and realize clear video image display having no speckle noise.

Specifically, for example, brightness of the video image is totally calculated from the video image data, total brightness in each scene is calculated, the amount of light that is incident on the SPM 8 is increased or decreased based on the total brightness, and a control operation is performed such that the brightness of the corresponding scene becomes appropriate brightness, in consideration of diffraction efficiency of the SPM 8. As a result, it is possible to provide a holographic projection method and a holographic projection device, which can achieve appropriate brightness and energy saving in the video image display.

In addition, speckle noise is reduced by changing and averaging the shapes of generated speckles, by adding a different random phase to each subframe.

Second Embodiment

Hereinafter, a holographic projection method and a holographic projection device according to a second embodiment of the present invention will be described. In this case, the description of the same contents as the contents that are described in the first embodiment will be omitted.

Figure 4A:
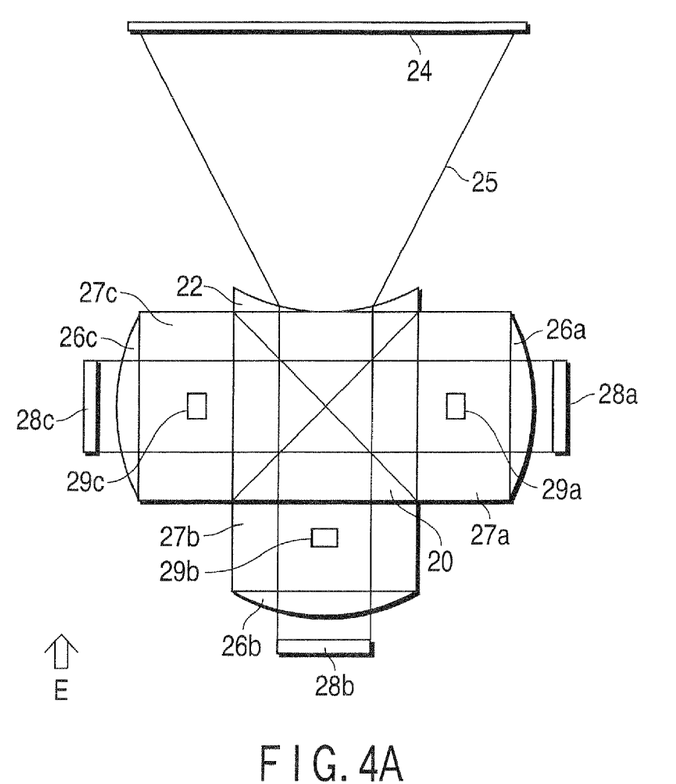
FIG. 4A is a diagram illustrating the configuration of a holographic projection device according to a second embodiment of the present invention disposed at a normal location, when viewed from an upper side.
Figure 4B:
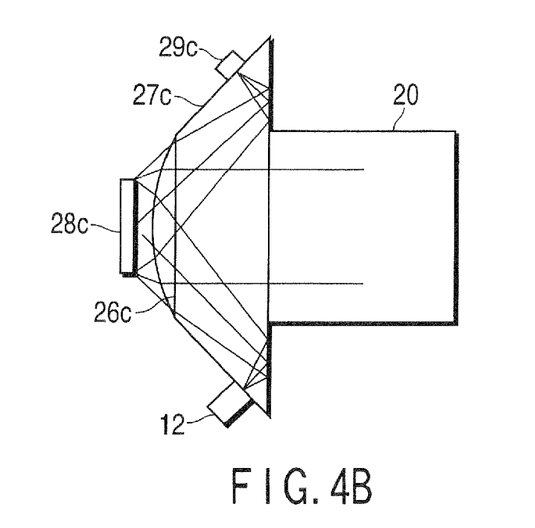
FIG. 4B is a diagram illustrating the configuration of a holographic projection device according to a second embodiment of the present invention disposed at a normal location, when a peripheral portion of an SPM for blue in the holographic projection device is viewed from a viewing direction E shown in FIG. 4A.

FIG. 4A is a diagram illustrating the configuration of a holographic projection device according to a second embodiment of the invention disposed at a normal location, when viewed from an upper side. FIG. 4B is a diagram illustrating the configuration of a holographic projection device according to a second embodiment of the invention disposed at a normal location, when a peripheral portion of an SPM for blue in the holographic projection device is viewed from a viewing direction E shown in FIG. 4A.

The holographic projection device according to the second embodiment includes an LD for red (not shown in FIG. 4A) that functions as a red light source, an LD for green (not shown in FIG. 4A) that functions as a green light source, an LD for blue (not shown in FIG. 4A) that functions as a blue light source, collimators 26a, 26b, and 26c that correspond to the light sources for the individual colors, respectively, total reflection prisms 27a, 27b, and 27c that correspond to the light sources for the individual colors, respectively, reflecting SPMs 28a, 28b, and 28c that correspond to the light sources for the individual colors, respectively, traps 29a, 29b, and 29c functioning as light shielding members that correspond to the light sources for the individual colors, respectively, a color synthesis prism 20 that synthesizes diffraction light of the individual colors, and a projection lens 22.

As shown in FIG. 4B, light emitted from the LD 12 for blue is reflected on the total reflection prism 27c, collimated by the collimator 26c, and incident on the SPM 28c for blue. In this case, zero-order light passes through the collimator 26c again, is reflected on the total reflection prism 27c, and reaches the trap 29c. In this way, the unnecessary zero-order light is removed.

Meanwhile, among light irradiated by the LD 12 for blue, the light diffracted by a spatial phase modulation for a blue video image displayed on the SPM 28c for blue becomes an approximately collimated light beam by the collimator, and is then incident on the color synthesis prism 20. The light beam incident on the color synthesis prism 20 is reflected on a reflection surface of the color synthesis prism 20. After the reflection, the diffraction light 25 is projected onto the screen 24 through the projection lens 22.

In addition, as shown in FIG. 4A, with respect to light emitted from each of the LD for red and the LD for green, the same optical system as the above-described LD for blue is provided, and diffraction light that is related to red, green, and blue is synthesized by the color synthesis prism 20. As a result, a full color video image is projected onto the screen 24.

In the second embodiment, as shown in FIG. 4A, the projection lens is composed of a concave lens (negative power), but may be composed of a convex lens (positive power). In addition, according to the above-described method, different from the color sequence method, a color break phenomenon does not need to be considered. In this case, in the SPMs 28a, 28b, and 28c, the LC and the LCOS may be used. However, since the LC cannot increase an opening ratio, the LC has bad light utilization efficiency. In addition, since the LCOS has low reflectance, it is difficult to improve diffraction efficiency. However, it is possible to overcome the above disadvantages by using an MMD, which will be described in detail below.

In addition, in regards to the process of the video image data or the like that has been described with reference to FIG. 2 and the on/off control on the light sources when altering the information of the SPM that has been described with reference to FIG. 3, the characteristics in the holographic projection method and the holographic projection device according to the second embodiment are the same as the characteristics in the holographic projection method and the holographic projection device according to the first embodiment.

As described above, according to the second embodiment, it is possible to provide a holographic projection method and a holographic projection device that can achieve the same effect as the holographic projection method and the holographic projection device according to the first embodiment.

Third Embodiment

Hereinafter, a holographic projection method and a holographic projection device according to a third embodiment of the present invention will be described. In this case, the description of the same contents as the contents that are described in the first and second embodiments will be omitted.

Figure 5:
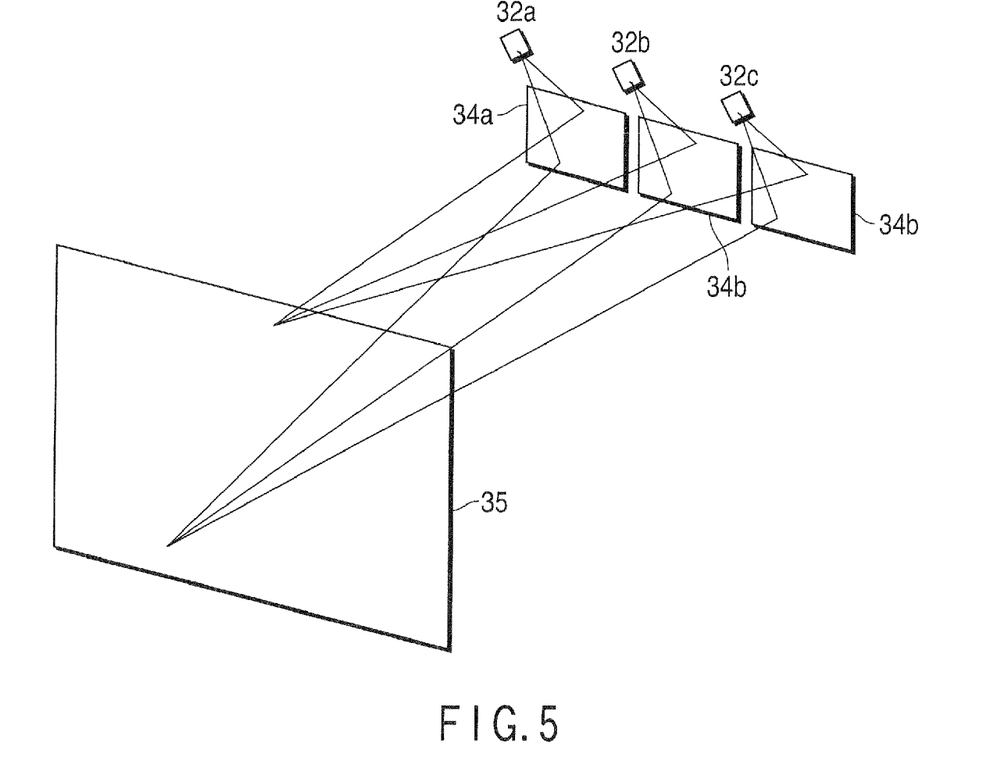
FIG. 5 is a diagram illustrating the configuration of a holographic projection device according to a third embodiment of the present invention.

FIG. 5 is a diagram illustrating the configuration of a holographic projection device according to a third embodiment of the invention. As shown in the drawing, the holographic projection device according to the third embodiment includes a light source 32a for red that functions as a red light source, a light source 32b for green that functions as a green light source, a light source 32c for blue that functions as a blue light source, and reflecting SPMs 34a, 34b, and 34c that correspond to the light sources for the individual colors, respectively.

In the second embodiment, three colors including red, green, and blue are synthesized by a color synthesis prism and color display is performed. However, in the third embodiment, the light source 32a for red, the light source 32b for green, and the light source 32c for blue, each of which is composed of an LD, and the SPMs 34a, 34b, and 34c are combined and arranged on the same plane in parallel to each other as shown FIG. 5, thereby realizing color display.

By this configuration, since the projection distance to the screen 35 is fixed, the holographic projection method and the holographic projection device according to the third embodiment may be applied to a rear-projection TV. Further, by this configuration, an optical system does not need to be installed. Therefore, a size of the device can be further reduced and the manufacturing costs thereof can be further reduced.

In addition, since the correction process by the optical arrangement that has been described with reference to FIG. 2 is executed according to the distance with the screen, it is possible to cope with the change in the projection distance.

Figure 6A:
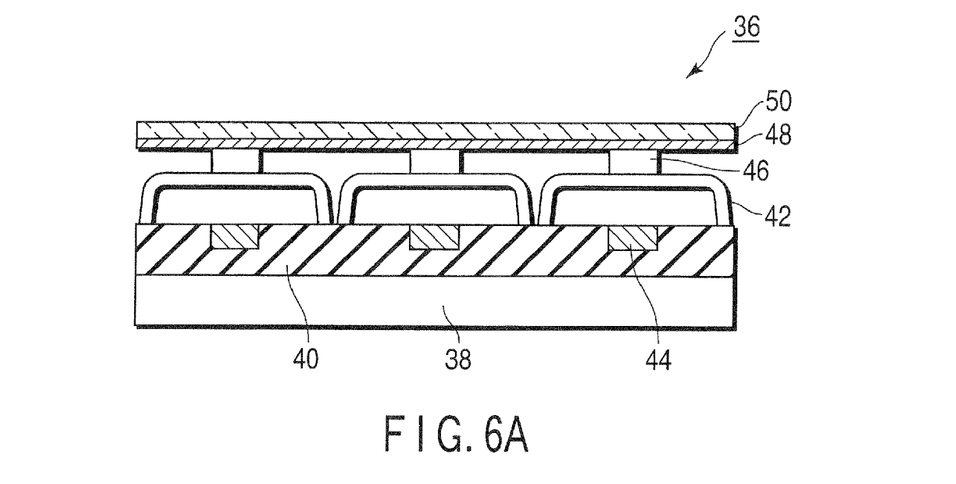
FIG. 6A is a cross-sectional view illustrating a reflecting MMD that is used in an SPM of a holographic projection device according to a third embodiment of the present invention.
Figure 6B:
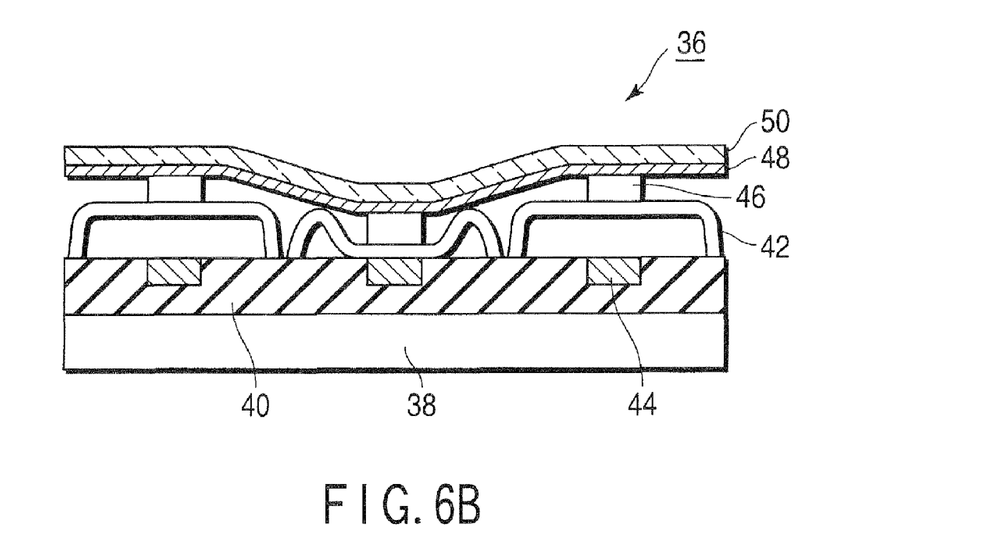
FIG. 6B is a cross-sectional view illustrating a reflecting MMD that is used in an SPM of a holographic projection device according to a third embodiment of the present invention.

FIGS. 6A and 6B are cross-sectional views illustrating an MMD that constitutes the SPMs 34a, 34b, and 34c of the holographic projection device according to the third embodiment of the invention. In the drawings, cross-sectional views of a portion corresponding to three pixels are shown, but actually, a plurality of pixels two-dimensionally exist. Hereinafter, the structure of the MMD will be described with reference to FIGS. 6A and 6B.

That is, in the third embodiment, an MMD 36 has a substrate 38, an insulating layer 40, springs 42, electrodes 44, columns 46, a thin film 48, and a mirror 50. The detailed structure of the MMD 36 is as follows.

First, the insulating layer 40 is provided on the substrate 38 including a switch circuit that drives each pixel to modulate a phase. Further, the springs 42 are provided on the insulating layer 40. In addition, the electrode 44 that is connected to the switch circuit is provided in a concave portion of the insulating layer 40 under each spring 42.

In this case, in the MMD 36, as shown in FIG. 6B, the mirror 50 can be deformed. That is, in the MMD 36, the spring 42 corresponds to each pixel for a phase modulation, and the thin film 48 is provided above the springs 42 in a state where the columns 46 provided on the springs 42 are interposed between the springs 42 and the thin film 48. In addition, the mirror 50 is integrally provided on the thin film 48.

As such, in the third embodiment, the mirror 50 does not adopt the structure where the mirror is divided to correspond to each spring 42, but adopts a piece of board-shaped structure. By this structure, the shape change of the mirror 50 is continuously and gradually generated. That is, an unnecessary diffraction order can be suppressed from being generated and diffraction efficiency can be improved.

In addition, the thin film 48 is formed of a material having excellent flexibility and durability. The mirror 50 is formed of a dielectric multilayer or a metal having high reflectance.

In this case, if a voltage is applied to the electrode 44, the spring 42 becomes close to the substrate 38 by means of a Coulomb force that is generated between the mirror and the electrode, and the surface of the mirror 50 is indented. The amount by which the phase of the light reflected on the mirror changes because of the indentation is ¼ of a wavelength. That is, in this way, it is possible to generate a phase difference of a half-wavelength on a reciprocal path, that is, $\pi$.

In addition, the above operation is a binary operation that only inverts a phase. However, if a spring constant of the spring 42 is appropriately selected, it is possible to control a strain of the spring 42 by the voltage, that is, the indentation of the mirror 50. In this case, if the mirror 50 is controlled to have an indentation that corresponds to half the maximum wavelength, it is possible to generate a phase difference that corresponds to a maximum of one wavelength on a reciprocal path. In addition, it is possible to obtain diffraction efficiency higher than that in the binary modulation.

In addition, for example, Si is used in the substrate 38, $SiO_2$ or SiC is used in the insulating layer 40, and a flexible metal or conductive organic film is used in the spring 42. In addition, a conductive material may be coated on the conductive organic film. In addition, in the electrode 44, for example, Al, Cu, or W is used. In the thin film 48, for example, a flexible organic film or $Si_2N_3$ is used.

As described above, according to the third embodiment, it is possible to provide a holographic projection method and a holographic projection device that not only achieves the same effect as the holographic projection method and the holographic projection device according to the first embodiment but also achieves the following effect.

That is, according to the third embodiment, it is possible to provide the SPMs 34a, 34b, and 34c having excellent efficiency that can reflect almost 100% of the incident light to use the mirror 50.

In addition, in regards to the binary control and the structure of the spring 42, the technologies that are disclosed in U.S. Pat. No. 5,835,255 and U.S. Pat. No. 6,040,937 may be referred to. In these documents, a technology that is related to an element that performs color display using a Fabry-Perot etalon principle is disclosed.

The present invention has been described based on the first to third embodiments. However, the present invention is not limited to the above-described embodiments, and various changes and modifications can be made without departing from the sprit and scope of the present invention.

Further, in the above-described embodiments, the invention of various steps is included, and various inventions can be extracted from proper combinations of the plurality of disclosed constituent elements. For example, even if some of the constituent elements described in the above-described embodiments are removed, when the problems described in the problem to be solved by the invention can be solved and the effects described in the effect of the invention can be achieved, the configuration where some constituent elements are removed can be extracted as the invention.

What is claimed is:

1. A holographic projection device comprising:
   a light source which emits light;
   a data processing unit having a calculation precision of at least 12 bits for gradation, which converts video image data into spatial frequency information including spatial phase information using Fourier transformation;
   a spatial light phase modulator which displays the spatial frequency information including the spatial phase information; and
   an optical system which casts light emitted from the light source onto the spatial light phase modulator;
   wherein the data processing unit adds a different random phase to the image data for each subframe, such that the random phase added to the image data for one subframe of a frame is different from the random phase added to the image data for another subframe of the same frame, and converts the resultant image data into information including the spatial phase information.

2. A holographic projection method comprising:
   converting video image data into spatial phase information using Fourier transformation after adding a different random phase to the video image data in each subframe, such that the random phase added to the video image data in one subframe of a frame is different from the random phase added to the video image data in another subframe of the same frame, wherein the video image data is the same in all of the subframes of one frame;

providing the spatial phase information to an information display unit;

displaying the spatial phase information as a phase distribution on the information display unit;

casting light emitted from a light source onto the information display unit;

controlling a driver of the light source based on the video image data to adjust an amount of light emitted from the light source, such that the amount of light corresponds to a brightness of a scene; and projecting diffraction light, which is emitted by the light source and modulated as the spatial phase information by the information display unit, onto a projection surface.

3. A holographic projection device comprising:

a light source;

a data processing unit which converts video image data into spatial phase information using Fourier transformation after adding random phases to the video image data;

a spatial light phase modulator which displays the spatial phase information;

an optical system which casts light emitted from the light source onto the spatial light phase modulator; and wherein the data processing unit (i) adds a different random phase to the image data for each subframe, such that the random phase added to the image data for one subframe of a frame is different from the random phase added to the image data for another subframe of the same frame, wherein the image data is the same for all of the subframes of one frame, and (ii) converts the resultant image data into information including the spatial phase information.

* * * * *